United States Patent [19]
Martin

[11] Patent Number: 4,767,141
[45] Date of Patent: Aug. 30, 1988

[54] CRUMB SHOVEL

[76] Inventor: Arthur T. Martin, 7370 Dowdy St., Gilroy, Calif. 95020

[21] Appl. No.: 71,932

[22] Filed: Jul. 10, 1987

[51] Int. Cl.⁴ .......................... A01B 1/02; A01B 1/22
[52] U.S. Cl. ...................................... 294/50; 294/55; 294/58
[58] Field of Search ................. 294/49, 50, 50.5, 50.7, 294/50.8, 55, 57, 58

[56] References Cited
U.S. PATENT DOCUMENTS

| | | | |
|---|---|---|---|
| 565,745 | 8/1896 | Harris | 294/50.5 |
| 625,629 | 5/1899 | Wyatt | 294/55 |
| 1,945,430 | 1/1934 | Garrett | 294/58 X |
| 2,141,007 | 12/1938 | Meeh | 294/57 X |
| 3,210,112 | 10/1965 | Glynn | 294/50.7 |
| 3,332,501 | 7/1967 | Parish | 294/50.7 X |

FOREIGN PATENT DOCUMENTS

| | | | |
|---|---|---|---|
| 127864 | 4/1950 | Sweden | 294/50.7 |
| 610424 | 10/1948 | United Kingdom | 294/50.5 |
| 865902 | 4/1961 | United Kingdom | 294/50.7 |
| 1360983 | 7/1974 | United Kingdom | 294/50.5 |

Primary Examiner—Johnny D. Cherry
Attorney, Agent, or Firm—Richard C. Litman

[57] ABSTRACT

A crumb shovel used to remove excess spoil, gravel, or soil from within any depth trench, cave-in, or the like. The crumb shovel has an elongated handle, a circular scoop, and is designed to be operated by one person. The scoop may provide a spring-loaded, knockout dumping system, such that when the spring is released the dumping system would push out the contents of the scoop. The handle is available with two options. The handle may have an arm with a lever to actuate the dumping system, or it may have either an adjustable or a fixed rear arm, or both.

3 Claims, 2 Drawing Sheets

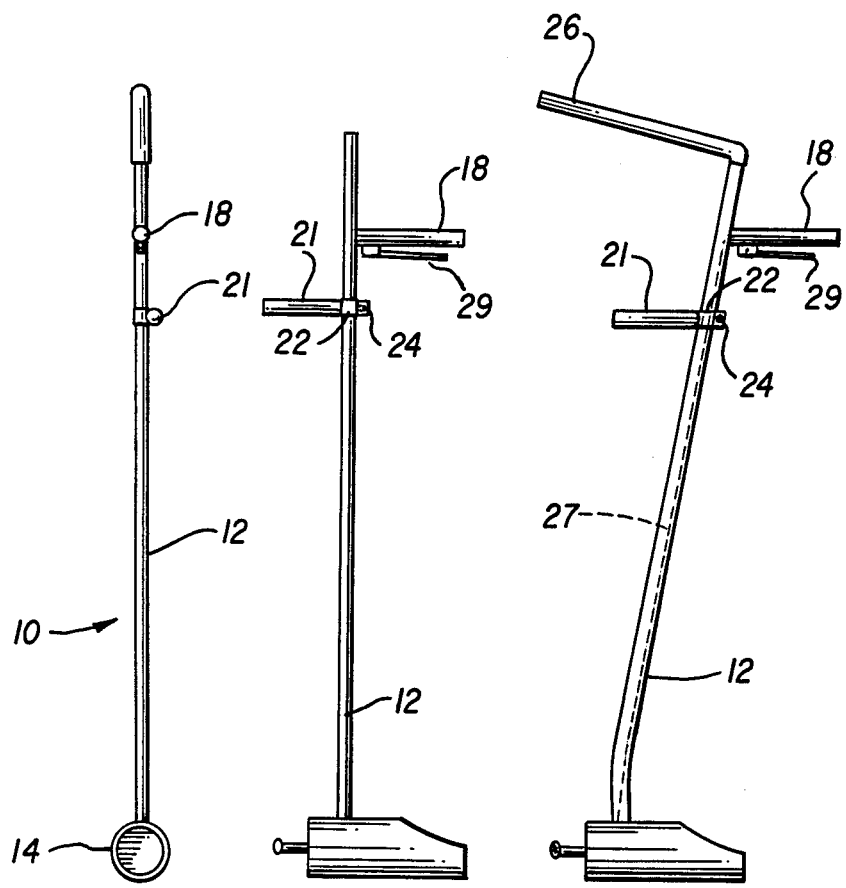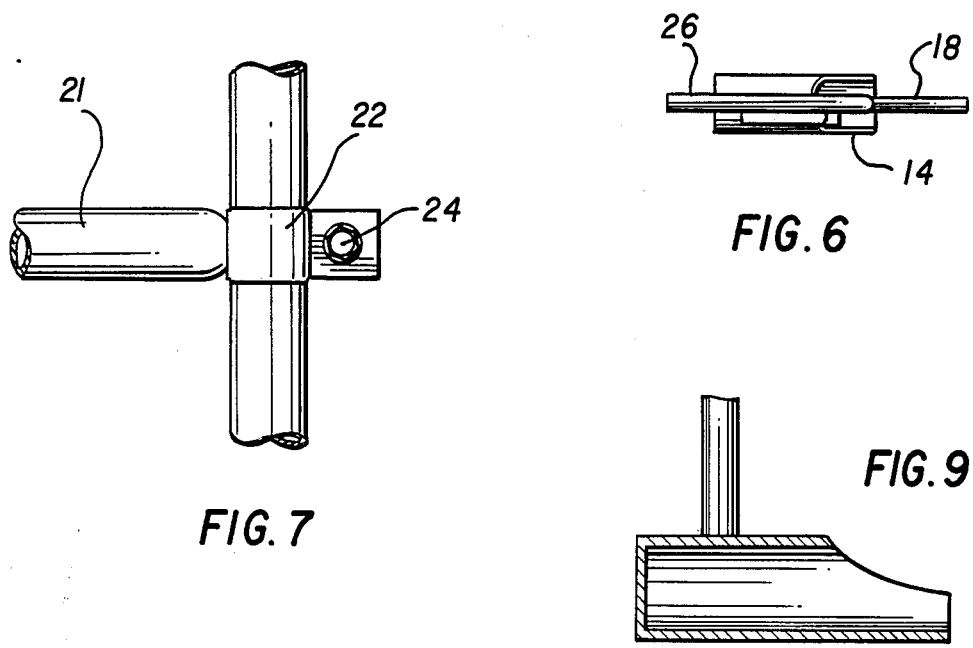

CRUMB SHOVEL

BACKGROUND OF THE INVENTION

Field of the Invention

The invention relates to a device for the removal of excess spoil, gravel or soil from trenches, cave-ins, or the like. More particularly, the invention is directed to providing means for the safe removal of the spoil from any depth trench or cave-in and which comprises a substantial improvement over existing practices, whereby one needs to climb down into the trench in order to reach the excess spoil, gravel, or soil.

The invention can be used for trenches or cave-ins of a variety of dimensions, particularly deep and narrow trenches, and is designed for use by one person. The method of construction of the device is more fully described herein.

Description of the Prior Art

Various prior art shoveling devices and the like, as well as their apparatuses and the method of their construction in general, are known and found to be exemplary of the U.S. prior art. They are:

| U.S. Pat. No. | Inventor |
| --- | --- |
| 1,411,195 | M. E. Shingler |
| 1,945,430 | H. A. Garrett |
| 2,141,007 | R. F. Meeh |
| 2,318,277 | A. E. Yensen |
| 2,571,244 | W. L. Hollander |
| 2,572,230 | E. Williams |
| 3,332,501 | R. Parish |
| 3,444,938 | V. H. Ballmann |
| 4,143,899 | H. E. Wetherall et al |

U.S. Pat. No. 4,143,899, issued to Wetherall et al, discloses a gathering implement that consists of a handle and a scoop. The scoop has a rearward and a forward member that are actuated together to gather objects. This particular invention does not, however, disclose adjustable handles and a spring-loaded dumping system.

U.S. Pat. No. 3,332,501, issued to Parish, discloses an implement for removing plugs of soil from the ground. This particular invention does provide a hand-lever actuated, ejector plate, but it is not designed for scooping.

U.S. Pat. No. 1,411,195, issued to Shingler, and 1,945,430, issued to Garret, disclose a compound tool that could be adjusted for use in trenches. Furthermore, these inventions provide an adjustable handle. Neither invention provides a circular scoop with a spring-loaded, knockout system.

These patents or known prior uses teach and disclose various types of shoveling devices of sorts and of various manufactures, and the like, as well as methods of their construction; but none of them, whether taken singly or in combination, discloses the specific details of the combination of this invention is such a way as to bear upon the claims of the present invention.

SUMMARY OF THE INVENTION

It is the primary objective of this invention to provide a novel mechanism which is used to remove excess spoil from within any depth trench, cave-in or the like.

It is another objective of the invention to provide a novel mechanism which is designed to be safe in use and operable by one person.

These, together with other objects and advantages of the invention, reside in the details of the process and the operation thereof, as is more fully hereinafter described and claimed. References are made to drawings forming a part hereof, where like numerals refer to like parts throughout.

DESCRIPTION OF THE DRAWINGS OF THE INVENTION

FIG. 4 is a front view of the invention.

FIG. 5 is a side view of the invention, illustrating a typical made of construction according to a preferred embodiment.

FIG. 6 is a top view of the invention.

FIG. 7 is a detailed view of the invention, showing an adjustable rear arm.

FIG. 8 is a side view illustrating an alternative embodiment having a straight shafted handle.

FIG. 9 is a sectional view of the alternative embodiment illustrating the mechanism without a spring loaded mechanism.

DESCRIPTION OF THE PREFERRED EMBODIMENT OF THE INVENTION

Figure 1:
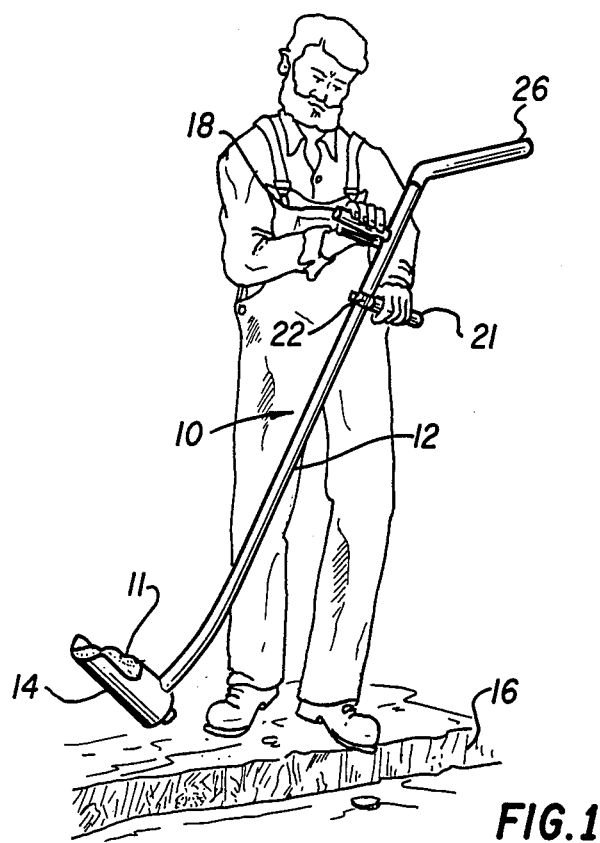
FIG. 1 is a perspective view of the invention, illustrating a typical mode of operation according to a preferred embodiment.
Figure 2:
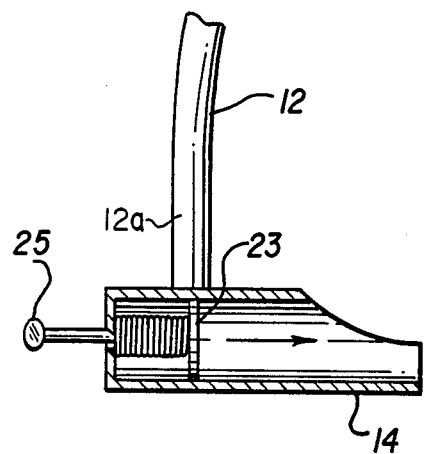
FIG. 2 is a sectional view of the invention, showing a typical construction of a spring-loaded knockout dumping system of the scoop.

FIG. 1 illustrates a typical environment in which one would use a crumb shovel 10. The crumb shovel 10 is operable by one person and is dragged along the floor of a trench 16 to remove the spoil 11. The crumb shovel 10 can also be used to remove gravel and soil from cave-ins or the like.

As detailed in the remaining Figures, the crumb shovel 10 is generally L-shaped and constructed of any suitable material such as steel, aluminum or other alloys and has an elongated handle 12 having a cylindrical scoop 14 attached adjacent its lower end and an optional, rear-fixed arm 26 attached adjacent its upper end. A fixed forward arm 18 is attached to handle 12, just below the optional fixed rear arm 26. There is also an adjustable rear-arm 21 that can be positioned anywhere between the scoop 14 and the forward arm 18 along the handle 12.

Attached to the handle 12 is a ring 22, which is secured to the handle 12 by an adjustable rear-arm 21 and a bolt 24 which is disposed therein. By loosening the bolt 24 that is screwed into the adjustable rear-arm 21, the ring 22 is allowed to move up and down along the longitudinal axis of the handle 12. It may then be secured in a position most desirable by the operator. The adjustable rear-arm 21 and the optional, rear-fixed arm 26 may be used simultaneously or they may be detached so that one or the other is used singularly.

A cylindrical scoop 14 is attached perpendicularly to the handle 12 and extends forward approximately 1 foot from its lower end 12a. Within the scoop 14 is a metal plate 23 that is used to expel the spoil 11 from the scoop 14 when the scoop 14 becomes full. The metal plate 23 can be rectilinearly actuated by the optional, spring-loaded, knockout dumping system 25.

Figure 3:
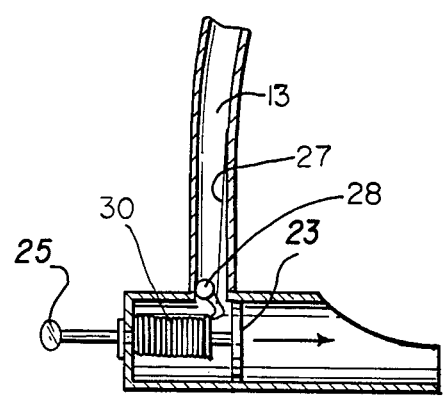
FIG. 3 is also a sectional view of the invention, showing a typical construction of a lever controlled spring-loaded knockout dumping system of the cylindrical scoop.

The fixed forward arm 18 is attached perpendicularly to the handle 12 and is located between the adjustable-rear arm 21 and the fixed-rear arm 26. The forward arm 18 extends approximately 20 inches from the handle 12 and is equipped with an optional lever release 29. The lever release 29 is used to actuate the metal plate 23 via the release element 27 which extends longitudinally throughout the core or hollow interior 13 of the handle 12 and actuates a catch 28 normally retaining the spring 30 in the position shown in FIG. 3.

FIGS. 8 and 9 illustrate an alternative embodiment to the invention and indicate that the device may be constructed to utilize a straight shafted handle 12' with or without a spring loaded dump mechanism.

With the above construction in mind it will be appreciated that with the scoop 14 containing spoil 11, as in FIG. 1, the operator may swing the handle 12 by means of the two arms 18 and 21 away from the trench 16 and thereafter readily discharge the spoil by manipulating the lever 29 to actuate or trip the spring catch 28.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications, and equivalents which may be resorted to, fall within the scope of the invention.

What is claimed is:

1. A crumb shovel for removing spoil, gravel or soil from within deep trenches or the like, comprising;
   an elongated handle provided with a hollow core and having first and second ends,
   a cylindrical scoop attached substantially perpendicularly to said handle first end,
   dumping means operable to expel spoil from within said scoop,
   an uppermost, rearwardly facing arm fixedly attached to said handle second end,
   a forwardly facing arm fixedly attached to said handle below said uppermost arm, a lever mounted adjacent said forwardly facing arm,
   a rearwardly facing arm attached to said handle beneath said forwardly facing arm, releasable fastening means attaching said rearwardly facing arm to said handle to allow selective vertical positioning along said handle,
   said dumping means including a rectilinearly displaceable plate within said scoop, spring means within said scoop normally urging said plate to expel spoil from within the scoop, catch means operable to retain said spring means and plate in a retracted position within said scoop, and an actuating element within said handle core joining said lever and catch means, whereby
   manipulation of said lever actuates said catch means to release said spring means and plate to expel spoil from said scoop.

2. A crumb shovel according to claim 1 wherein, said handle is substantially straight.

3. A crumb shovel according to claim 1 wherein, said handle includes a bend adjacent said scoop.

* * * * *